(12) United States Patent
Muco et al.

(10) Patent No.: US 10,894,878 B2
(45) Date of Patent: Jan. 19, 2021

(54) HALOGEN FREE AND FIRE-RESISTANT RUBBER COMPOSITION AND HOSE

(71) Applicant: EATON INTELLIGENT POWER LIMITED, Dublin (IE)

(72) Inventors: Recep Muco, Corlu (TR); Muslum Eren, Cerkezkoy (TR); Volkan Karayazi, Corlu (TR); Ozgur Caliskan, Cerkezkoy (TR); Tekin Coskun, Kapali (TR); Ali Aktas, Cerkezkoy (TR)

(73) Assignee: EATON INTELLIGENT POWER LIMITED, Dublin (IE)

( * ) Notice: Subject to any disclaimer, the term of this patent is extended or adjusted under 35 U.S.C. 154(b) by 103 days.

(21) Appl. No.: 16/062,115

(22) PCT Filed: Dec. 14, 2016

(86) PCT No.: PCT/EP2016/081015
§ 371 (c)(1),
(2) Date: Jun. 14, 2018

(87) PCT Pub. No.: WO2017/102848
PCT Pub. Date: Jun. 22, 2017

(65) Prior Publication Data
US 2019/0010317 A1 Jan. 10, 2019

(30) Foreign Application Priority Data
Dec. 15, 2015 (GB) .................................. 1522142.7

(51) Int. Cl.
*C08L 23/08* (2006.01)
*H01B 3/44* (2006.01)
(Continued)

(52) U.S. Cl.
CPC ............ *C08L 23/0853* (2013.01); *C08K 3/04* (2013.01); *C08K 3/08* (2013.01); *C08K 3/22* (2013.01);
(Continued)

(58) Field of Classification Search
CPC .. C08L 23/0853; C08L 23/16; C08L 2201/02; H01B 3/441; H01B 3/448;
(Continued)

(56) References Cited

U.S. PATENT DOCUMENTS

| 4,675,248 A | 6/1987 | Buding et al. |
| 4,759,388 A | 7/1988 | Kiyama et al. |

(Continued)

FOREIGN PATENT DOCUMENTS

| CN | 103756223 A | 4/2014 |
| CN | 104371199 A | 2/2015 |

(Continued)

OTHER PUBLICATIONS

English Translation of CN104371199 (Year: 2013).*

*Primary Examiner* — Andrew J. Oyer
(74) *Attorney, Agent, or Firm* — Leydig, Voit & Mayer, Ltd.

(57) ABSTRACT

A halogen-free, fire resistant rubber composition for a fire resistant hose includes: 100 parts by weight of elastomer having a blend of: 60 to 70 parts of ethylene vinylacetate elastomer (EVM), a vinylacetate content of EVM being in the range from 60 to 70% by weight; 40 to 30 parts of terpolymer of ethylene, propylene, and a diene elastomer (EPDM), an ethylene content of EPDM being in the range from 30 to 40% by weight and a propylene content of EPDM being from 60 to 70% by weight; at least one fire retardant ingredient; and at least one vulcanizing agent. The vulcanizing agent is a peroxide curative.

15 Claims, 1 Drawing Sheet

(51) Int. Cl.
- *C08K 5/11* (2006.01)
- *F16L 11/12* (2006.01)
- *C08K 3/04* (2006.01)
- *C08K 3/22* (2006.01)
- *C08K 3/36* (2006.01)
- *C08K 5/14* (2006.01)
- *C08L 23/16* (2006.01)
- *H01B 3/28* (2006.01)
- *C08K 3/26* (2006.01)
- *C08K 3/016* (2018.01)
- *C08K 3/08* (2006.01)

(52) U.S. Cl.
CPC .......... *C08K 3/36* (2013.01); *C08K 5/11* (2013.01); *C08K 5/14* (2013.01); *C08L 23/16* (2013.01); *F16L 11/125* (2013.01); *H01B 3/441* (2013.01); *H01B 3/448* (2013.01); *C08K 2003/0812* (2013.01); *C08K 2003/2224* (2013.01); *C08K 2003/2296* (2013.01); *C08L 2201/02* (2013.01); *H01B 3/28* (2013.01)

(58) Field of Classification Search
CPC ... H01B 3/28; C08K 5/11; C08K 3/08; C08K 3/04; C08K 3/22; C08K 3/36; C08K 5/14; C08K 2003/0812; C08K 2003/2224; C08K 2003/2296; C08K 3/016; C08K 2003/2206; C08K 2003/2227; C08K 2003/267; F16L 11/125

See application file for complete search history.

(56) References Cited

U.S. PATENT DOCUMENTS

| | | | |
|---|---|---|---|
| 4,769,179 A * | 9/1988 | Kato | C08K 3/22 252/601 |
| 5,274,035 A | 12/1993 | Chundury | |
| 5,683,773 A | 11/1997 | Kemper | |
| 7,654,288 B2 | 2/2010 | Fukaya et al. | |
| 2004/0242770 A1* | 12/2004 | Feldstein | A61K 8/0208 525/54.3 |
| 2006/0100328 A1 | 5/2006 | Goossens | |
| 2010/0125118 A1* | 5/2010 | Brant | C08L 23/12 524/423 |

FOREIGN PATENT DOCUMENTS

| | | |
|---|---|---|
| CN | 104761809 A | 7/2015 |
| EP | 0370361 A2 | 5/1990 |
| EP | 0390647 A1 | 10/1990 |
| EP | 1974902 A2 | 10/2008 |

\* cited by examiner

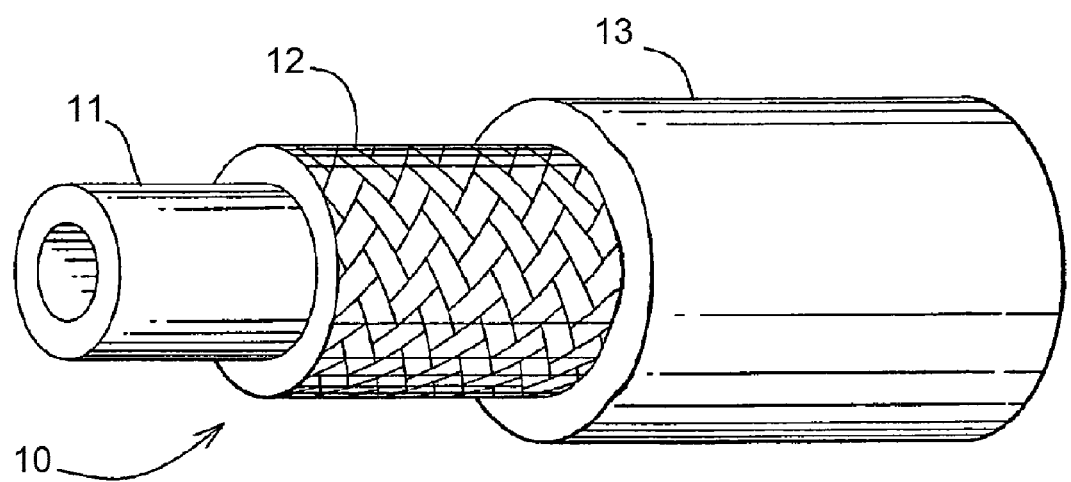

ated rubber composition. The invention also relates to a fire-resistant hose comprising the halogen free and fire-resistant rubber composition.

HALOGEN FREE AND FIRE-RESISTANT RUBBER COMPOSITION AND HOSE

CROSS-REFERENCE TO PRIOR APPLICATIONS

This application is a U.S. National Phase application under 35 U.S.C. § 371 of International Application No. PCT/EP2016/081015, filed on Dec. 14, 2016, and claims benefit to Great British Patent Application No. GB 1522142.7, filed on Dec. 15, 2015. The International Application was published in English on Jun. 22, 2017 as WO 2017/102848 under PCT Article 21(2).

FIELD

The present invention relates to a halogen-free and fire-resistant rubber composition. The invention also relates to a fire-resistant hose comprising the halogen free and fire-resistant rubber composition.

BACKGROUND

Elastomeric compounds are useful in the fabrication of rubber hoses. Rubber hoses are widely used for material transfer and fluid power applications. Elastomeric compounds, for instance, useful in the fabrication of automotive hoses include chlorinated polyethylene, chlorosulfonated polyethylene and epichlorohydrin elastomers as disclosed for example in U.S. Pat. No. 5,683,773. Compounds made by using these polymers possess good mechanical properties, low compression set, good low temperature flexibility, and good dynamic fatigue resistance. These compounds also exhibit excellent aging, weathering, chemical and ozone resistance due to their saturated backbones, and the polarity contributed by the chlorine and ether components provide good oil swell resistance. It is known that halogen-containing fire retardants and halogenated polymers are corrosive and generate much smoke and toxic fumes. One of the major drawbacks of smoke is its toxicity. About fifty percent of the fire casualties are due to smoke and gases produced in a fire. Regarding the toxicity of smoke, it is important not only to consider the acute toxicity but also the gases with environmental impact and long-term effects. In attempting to make a contribution to a variety of environmental problems latest OEM environmental requisites for a hydraulic hose not containing Chlorine, Fluorine and Iodine has replaced its standard range of hydraulic hose with an environmental friendly HF range of product. Therefore recent prior art is generally directed to halogen-free compositions.

As its tools and technologies advance, modern fluid power systems are under greater pressure than ever before to perform safely and precisely. Fire resistance standards for hoses used in fluid power systems have become increasingly stringent. The most stringent standards apply to hoses used in railway applications. The demand for base material certified according to a European standard for railway applications is increasing as the transportation industry continues to define safety requirements for mass transit.

Examples of such requirements are covered in EN 45545-2:2013 which specifies the reaction to fire performance requirements for materials and products used on railway vehicles as defined in EN 45545-1. Requirements of these fire resistance standards are that materials have very high limiting oxygen index (LOI) according to EN ISO 4589-2, generate very low smoke density during burning according to EN ISO 5659-2 and only emit gases with very low toxicity according to NF X70-100-2. Other requirements include that the materials have very high flammability temperature, be self-extinguishing when on fire, be halogen-free and heavy metal free, and be electrically isolating. At the same time, the hose must comply with the various conventional design requirements such as burst pressure, cold flexibility, oil resistance, hot air resistance, ozone resistance, and structural integrity of various adhered layers.

In an effort to meet the aforementioned considerations, a number of elastomers and rubbers have been used. Much prior art is directed to improving the fire resistance of wire and cable insulation. For example, U.S. Pat. No. 4,675,248 discloses a blend of ethylene-vinylacetate (EVM) and hydrogenated nitrile-butadiene rubber (HNBR) with a synergistic fire retarding combination of aluminum trihydrate (ATH) and zinc borate (ZB). It has been shown in a related publication by Herman Meisenheimer, "Low smoke, non-corrosive, fire retardant, cable jackets based on HNBR and EVM, Rubber World, 19 (June 1991) that very high values of LOI can be obtained at very high loadings of ATH, but that tear strength specifications are not met by the resulting compositions.

U.S. Pat. No. 5,274,035 discloses ethylene-vinylacetate compositions and medical tubing made therefrom. The compositions comprise a major amount of ethylene-vinylacetate and a minor amount of one or more other polymers. The other polymers may include a terpolymer of an alpha olefin, an acrylic ester, and an olefinically unsaturated dicarboxylic acid, such as ethylene/methyl acrylate/maleic anhydride. Suitable ethylene-vinylacetate comprises from 5 to 50 percent by weight of vinylacetate.

Hose physical requirements are different, generally more demanding, than medical tubing, wire and cable requirements.

U.S. Pat. No. 4,675,248 describes fire resistant rubber compositions suitable for the production of cable sheaths and conveyor belt covers. The compositions are produced by the co-vulcanization of a nitrile elastomer with the ethylene-vinylacetate elastomer in order to achieve strength and high densities.

U.S. Pat. No. 4,769,179 is directed to fire resistant rubber compositions for use in hoses, among other things. The composition contains an ethylenic elastomer, a metal hydrate, and crosslinking agents. The compositions may further comprise an auxiliary fire retardant.

U.S. Patent Publication No. 2006/0100328 A1 describes a halogen free, fire resistant rubber compositions specifically for use in hoses. The compositions contain two or more specified elastomers. The two specified elastomers are generally an olefin-type elastomer and a nitrile-containing elastomer. Additionally the compositions further require the presence of a specific combination of fire-retardant additives. Indeed, even though the compositions disclosed therein sufficiently met the target flame resistance and smoke generation tests according to European local standards such as BS 6853 and NF F 16-101 they do not meet the replacing fire resistance standards according to EN 45545-2:2013. Additionally, fire retarded materials containing nitrogen compounds are known to evolve hydrogen cyanide, nitrogen monoxide and nitrogen dioxide when strongly heated or incompletely burned.

U.S. Pat. No. 4,759,388 discloses a hose comprising inner and outer tubes of an acrylic rubber. The acrylic rubber may be acrylic acid lower alkyl ester alone, or the ester as a main component polymerized with copolymerizable monomer under the presence of a cross linking agent. The acrylic rubber may be a copolymer comprising acrylic acid lower alkyl ester as a main component and ethylene-vinylacetate as copolymer components.

European Patent Publication No. 0 370 361 A2 discloses soft, elastic polymer mixtures based on crosslinked, particulate alkyl acrylate rubbers and hydrolyzed ethylene-vinylacetate copolymers.

Paper No. 187 presented at the meeting of the Rubber Division, American Chemical Society, Orlando, Fla., Sep. 21 through 24, 1999, discloses the use of ethylene-vinylacetate in compounds suitable for use in automotive hoses. The ethylene-vinylacetate compounds disclosed utilize enhanced viscosity ethylene-vinylacetate that has been partially crosslinked via peroxide or radiation. The ethylene-vinylacetate compounds therein are shown to have superior high temperature property retention as compared with compounds of chlorosulfonated polyethylene or ethylene/methyl acrylate terpolymer.

As from many discussions and studies have been made so far it is clear that combinations are rarely synergistic. Sometimes, specific combination of fire-retardant additives with specific elastomers leads some additive effects but none of them meets the stringent requirements of current and future needs. In general, to achieve good fire retardant properties fire retardant additives in EVM are required. However, high loadings drastically change the mechanical properties of the material. To overcome this disadvantage, several solutions are possible. The combination of mineral filler with other conventional flame retardants to develop synergestic effects are still being investigated.

What is still needed is a rubber composition with improved fire resistance, low smoke formation, low toxicity, processability and physical properties to meet the stringent hose performance standards discussed above.

SUMMARY

In an embodiment, the present invention provides a halogen-free, fire resistant rubber composition for a fire resistant hose, the composition comprising: 100 parts by weight of elastomer comprising a blend of: 60 to 70 parts of ethylene vinylacetate elastomer (EVM), wherein a vinylacetate content of EVM is in the range from 60 to 70% by weight; 40 to 30 parts of terpolymer of ethylene, propylene, and a diene elastomer (EPDM), wherein an ethylene content of EPDM is in the range from 30 to 40% by weight and a propylene content of EPDM is from 60 to 70% by weight; at least one fire retardant ingredient; and at least one vulcanizing agent, wherein the vulcanizing agent comprises a peroxide curative.

BRIEF DESCRIPTION OF THE DRAWINGS

The present invention will be described in even greater detail below based on the exemplary FIGURES. The invention is not limited to the exemplary embodiments. Other features and advantages of various embodiments of the present invention will become apparent by reading the following detailed description with reference to the attached drawings which illustrate the following:

FIG. 1 is a perspective view of a hose constructed in accordance with the present invention.

DETAILED DESCRIPTION

The present inventors have found that a synergistic combination of ethylene vinylacetate elastomer and ethylene, propylene, and a diene achieves the most stringent hose requirements of limiting oxygen index (LOI), low smoke density and low toxic gas generation.

In an embodiment, the present invention provides a halogen-free, fire resistant rubber composition comprising 100 parts by weight of elastomer comprising a blend of:
  60 to 70 parts of ethylene vinylacetate elastomer (EVM), wherein vinylacetate content of EVM is in the range from 60 to 70% by weight, and
  40 to 30 parts of terpolymer of ethylene, propylene and a diene elastomer (EPDM), wherein ethylene content of EPDM is in the range from 30 to 40% by weight, and propylene content of EPDM is from 60 to 70% by weight,
  at least one fire retardant ingredient, and
  at least one vulcanizing agent, wherein the vulcanizing agent is a peroxide curative.

In an embodiment, the present invention provides a fire resistant hose comprising the rubber composition of the present invention.

In an embodiment, the present invention provides a method for preparing the rubber composition of the present invention.

Ethylene vinylacetate (EVA) copolymers can have, depending on the content of the monomers in the copolymer, thermoplastic or elastomeric properties. As the percentage of vinylacetate on the polyethylene backbone increases, the composition switches from a thermoplastic to an elastomer. As the polyethylene backbone nears saturation with vinylacetate, the composition switches back to a thermoplastic. Typically, the middle range, where the composition is an elastomer, is called EVM. The range of elastomeric properties is between 33% and 80% vinylacetate on the polyethylene backbone.

The structure of EVA is presented in Formula 1.

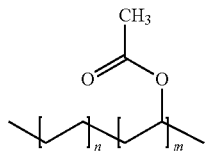

Formula 1

The physical properties of EVA depend on the vinylacetate content in the material. EVA has no sulfur-curable sites that are present in the polymer structure which leads to the fact that EVA is vulcanized radically with peroxides or high energy radiation. The main advantage of EVA materials is the adaptability of desired mechanical properties and the thermal decomposition thanks to variation of the VA content in the polymer. It is also important that EVA-materials perform high fire retardancy. Fire retardancy of EVA also depends on the vinylacetate content. It is known that the limiting oxygen index (LOI) of EVA increases with increasing vinylacetate content.

EPDM rubber which is a type of synthetic rubber, is an elastomer characterized by a wide range of applications. EPDM rubber is a terpolymer of ethylene, propylene, and a diene-component with the residual unsaturated portion of the diene in the side chain. The ethylene content is typically around 45% to 85%. The amount of ethylene in the EPDM elastomer will affect the material's end use characteristics. A high concentration of ethylene imparts a more crystalline nature to the EPDM and will increase its glass transition temperature (Tg), and melting temperature. The higher the ethylene content, the higher the loading possibilities of the polymer, better mixing, and extrusion. Amorphous or low crystalline grades have excellent low temperature flexibility with glass transition points of about minus 60° C. The dienes, typically comprising from 2.5% to 12% by weight of the composition, serve as cross-links when curing with sulphur and resin; with peroxide cures, the diene functions as a coagent, which provides resistance to unwanted tackiness, creep, or flow during end use.

The rubber composition of the present invention comprises an elastomeric blend of EVM and EPDM. Both EVM and EPDM are known in the state of the art however the combination according to the present invention is new. Though the effects of each component are generally known for some polymer systems in the art, the effects of combining these ingredients and/or using them in different polymer systems are synergistic and unpredictable.

It has now surprisingly been found that by combining EVM and EPDM a material having superior fire-resistance properties in addition to physical properties for rubber hose to comply with are achieved. The art of formulating such compositions is highly empirical, due to the complex interactions between the components and the elastomer and chemical reactions during curing. Thus, the improvements sought are very difficult to achieve. For example, in accordance with the EN norms hose should be flexible after cold flexibility test at −40° C. So that resistance to cold temperature is one of the main requirements in rubber composition design. Blending of EVM and EPDM elastomer was the most critical approach to meet cold temperature flexibility test.

Use is made in the present invention of a rubber composition comprising an elastomeric blend of EVM and EPDM with suitable vulcanizing agents and suitable fire retarding ingredients.

According to the present invention a suitable rubber composition of the present invention comprises 100 parts by weight of elastomer comprising from 60 to 70 parts of EVM and 40 to 30 parts of EPDM.

According to the present invention a suitable EVM contains from 60 to 70% by weight of vinylacetate and from 40 to 30% by weight of ethylene. Preferably, EVM contains around 65% by weight of vinylacetate.

In one preferred embodiment, the rubber composition of the present invention comprises an elastomeric blend comprising more than one type of EVM, each one of which having different contents of vinylacetate in the range from 60 to 70% by weight. Preferably, the vinylacetate content of the first EVM is from 60 to 65% by weight and the vinylacetate content of the second EVM is from 65 to 70% by weight of vinylacetate. More preferably, the vinylacetate content of the first EVM is from 60 to 65% by weight and the vinylacetate content of the second EVM is from 65 to 70% by weight of vinylacetate.

In another preferred embodiment, the rubber composition of the present invention comprises 100 parts by weight of elastomer comprising 45 parts of the first EVM containing 60 to 65% by weight of vinylacetate, and 20 parts of the second EVM containing 65 to 70% by weight of vinylacetate. Preferably, vinylacetate content of the first EVM is 60% by weight and the vinylacetate content of the second EVM is 70% by weight.

According to the present invention a suitable EPDM preferably contains from 30 to 40% by weight of ethylene and from 60 to 70% by weight of propylene. EPDM has the residual unsaturated portion of the diene, preferably in the side chain. EPDM preferably contains from 3 to 5% by weight of diene. In one preferred embodiment, the rubber composition of the present invention comprises 100 parts by weight of elastomer comprising 35 parts of EPDM containing from 30 to 40% by weight of ethylene and from 60 to 70% by weight of propylene.

As a fire retardant ingredient used, the fire retardant metal hydrate is preferably one or more selected from the group comprising aluminum trihydrate (ATH), magnesium hydroxide, calcium hydroxide, magnesium carbonate and the like. Alternatively, the rubber composition of the present invention contains conventional fire retardants as known to those skilled in the art, for example, phosphate ester fire retardands as well as halogen containing fire retardants such as chloro paraffins. The large amounts of halogen containing fire retardants typically used in rubber compounding should be avoided because of their contribution to toxic smoke.

The amount of fire retardant ingredient is in the range of from 75 to 195 parts per hundred parts by weight of elastomer. Below 75 parts, there will not be sufficient fire-retarding effect. Above 195 parts, the processability and physical properties of the composition will degrade. In particular, excessively high levels of metal hydrate lead to excessively high-viscosity compositions that cannot be mixed and/or extruded properly.

In one embodiment, the rubber composition of the present invention comprises ATH and magnesium hydroxide as fire retardant ingredients. Preferably, the amount of ATH present in the composition is in the range from 100 to 150 parts per hundred parts by weight of elastomer and the amount of magnesium hydroxide present in the composition is in the range from 25 to 30 parts.

In addition to EVM, EPDM and the fire retardant ingredient, the rubber composition of the present invention may contain conventional additives as known to those skilled in the art. These include but are not limited to reinforcing agents, fillers, pigments, accelerators, adhesion promoters, antiozonants, antioxidants, processing aids, coagents, coupling agents, vulcanizing agents, activators, initiators, plasticizers, waxes, prevulcanization inhibitors, extender oils and the like. Ingredients containing heavy metals, halogens, or otherwise likely to contribute toxic fumes or smoke should be avoided or kept to a minimum.

Silica is primarily used as the reinforcing filler, giving control over the modulus and increasing the tensile strength of the rubber composition. Silica is inert to fire, so it does not contribute to smoke as carbon black does. Suitable silica sources include clays, talcs, fumed or precipitated silica or silicates, and siliceous earth, and these may optionally be silane treated. The amount of silica is not critical, but may be chosen to give the desired physical properties.

A small amount of carbon black, less than 20 parts per hundred parts by weight of elastomer may be used to provide better physical properties and coloring. One of the typical carbon blacks that are used is FEF N550. The large amounts of carbon black typically used in rubber compounding should be avoided because of carbon black's contribution to smoke. In one embodiment of the invention, less than 15 parts of carbon black may be used. Likewise, conventional plasticizers should be avoided because they would impart increased flammability and smoke.

Curatives are required in the composition to produce required physical properties. Peroxide curatives or vulcanization with saturated steam or vulcanization by ionizing radiation are preferred because both EVM and EPDM can be cured with free radicals. Free radical curing does not introduce any toxic fumes or heavy metals as some types of conventional sulfur-based accelerators would. Curatives that may be employed in the compositions of the invention include, for example, dicumyl peroxide, Di(tert-butylperoxyisopropyl)benzene and 2,5-Dimethyl-2,5-di-(tert-butylperoxy)-hexane and the like. The amount of curatives that can be used may vary. Generally, the amount of the curative ranges from 5 to 10 parts per hundred parts by weight of elastomer based on the active parts of peroxide.

Plasticizers may also preferably be used to provide improved physical properties. Bis(2-ethylhexyl) adipate (DOA) used primarily as a plasticizer in the flexible vinyl industry may be preferred due to its low pour point.

Vulcanizing activators may also be used to increase the effectiveness of the vulcanization. A very small amount of zinc oxide, less than 10 parts per hundred parts by weight of elastomer may be preferred due to its low cost amongst the other metal oxides to increase the effectiveness as well as the heat stabilization of the vulcanization.

The blending of the rubber composition can be accomplished by methods known to those having skill in the rubber blending art. Curing of the rubber composition is preferably carried out at conventional temperatures ranging from 160° C. to 180° C.

The compositions of the invention may be used in the fabrication of hoses and the like such as hydraulic hoses useful in railway applications. The compositions may be extruded or otherwise fabricated as one or more layers of a single or multilayered hose. Other layers in the hose may be fabricated from materials as are known in the state of the art.

Referring to FIG. 1, a typical hose 10 is illustrated, constructed according to one embodiment of the present invention. The hose 10 comprises an elastomeric inner tube 11, a reinforcement member 12 telescoped over and preferably adhered to the inner tube 11, and an elastomeric outer cover 13 telescoped over and preferably adhered to the reinforcement member 12. The reinforcement member 12 is formed of a suitable material which may include organic or inorganic fibers or brass-plated steel wires. The reinforcement member 12 may comprise one or more layers of fiber reinforcement and one or more fiber reinforcement materials.

The inner tube 11 may consist of multiple elastomeric or plastic layers which may or may not be of the same composition. The elastomeric outer cover 13 is made of suitable materials designed to withstand the exterior environment encountered. The inner tube 11 and the outer cover 13 may be made of the same material. The hose 10 may be formed by any conventional methods including molding and extrusion. At least one elastomeric layer of either the inner tube 11 or outer cover 13 may be made more fire resistant according to the present invention, thus improving the fire resistance of the hose.

In one embodiment of the present invention, the hose 10 comprises at least one layer of rubber of the inventive composition. In another embodiment of the present invention, substantially all of the rubber in the hose is of the inventive composition. The inventive composition may be adjusted using known rubber compounding techniques to achieve different properties for various layers.

The following examples are provided to illustrate the present invention and are not intended as a limitation on the scope thereof.

Examples

Two rubber compositions according to the proportions indicated in Table 1 were prepared by combining all ingredients in an internal mixer and blending using techniques well known in the art. Both Example 1 and Example 2 are suitable for a cover compound and a rubber tube. The resulting rubber compounds were formed into 3 mm plaques. The two rubber compositions of Examples 1 and 2 met the target LOI, Smoke Density and Toxicity as shown in Table 1. Physical properties of these two rubber compositions including hardness, tensile strength and elongation at break met the targets for railway brake hose as shown in Table 1.

The resulting rubber compounds were formed into a 51 mm hose with metallic reinforcement for Example 3 and a 8 mm hose with textile reinforcement for Example 4. These hoses also met target LOI, Smoke Density and Toxicity as shown in Table 1.

TABLE 1

|  | Ex. 1 (3 mm Tube) | Ex. 2 (3 mm Tube) | Ex. 3 (Hose 51 mm) | Ex. 4 (Hose 8 mm) |
|---|---|---|---|---|
| Ingredients (parts by weight) | | | | |
| EVM - 65% Vinylacetate | 65 | 70 | | |
| EPDM - 35% Ethylene, 65% Propylene, <5% Diene | 35 | 30 | | |
| Carbon black, FEF N550 | 11.5 | 11.5 | | |
| Precipitated amorphous silica | 17 | 17 | | |
| DOA [Bis(2-Ethylhexyl) Adipate] | 17 | 17 | | |
| Zinc oxide | 5 | 5 | | |
| ATH (Alumina Trihydrate) | 121 | 121 | | |
| Mg(OH)$_2$ | 28 | 28 | | |
| Other chemicals* | 32 | 32 | | |
| Physical properties | | | | |
| Hardness (ShA) | 73 | 75 | | |
| Tensile strength (MPa) | 50 | 55 | | |
| Elongation at break (%) | 350 | 300 | | |
| LOI (%) (Target ≥ 32%) (Dimensionless) | 34.5 | 31.7 | 34.6 | 38.6 |
| Smoke density (Ds max) (25 kW/m$^2$ - Flaming) (Target ≤ 150) (Dimensionless) | 85 | 58 | 48 | 82 |
| Toxicity (CIT$_{NLP}$) (Target ≤ 0.75) (Dimensionless) | 0.09 | 0.10 | 0.14 | 0.15 |

LOI testing was carried out in accordance with the procedure of EN ISO 4589-2. Toxicity testing was carried out in accordance with the procedure NF X 70-100-1/-2. Smoke testing was carried in accordance with the procedure of EN ISO 5659-2

Rubber test specimens were tested for hardness, tensile strength and elongation at break using well known rubber test methods.

The present invention provides a fire-resistant rubber composition and hose incorporating the same which combines the desired physical performance properties of a hose with high LOI and low smoke and low toxic fume generation when subjected to fire. The composition may also be useful in wire and cable applications, power transmission belts, and molded rubber goods whenever extreme fire resistance is needed.

Although the present invention has been described in detail for the purpose of illustration, it is to be understood that such detail is solely for that purpose and that variations can be made therein by one skilled in the art without departing from the scope of the claims.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A halogen-free, fire resistant rubber composition for a fire resistant hose, the composition comprising:
   100 parts by weight of elastomer comprising a blend of:
   60 to 70 parts of ethylene vinylacetate elastomer (EVM), wherein a vinylacetate content of EVM is in the range from 60 to 70% by weight;
   40 to 30 parts of terpolymer of ethylene, propylene, and a diene elastomer (EPDM), wherein an ethylene content of EPDM is in the range from 30 to 40% by weight and a propylene content of EPDM is from 60 to 70% by weight;
   75 to 195 parts by weight of fire retardant ingredient per hundred parts by weight of elastomer, wherein the fire retardant ingredient comprises one or more selected from the group consisting of aluminum trihydrate (ATH), magnesium hydroxide, calcium hydroxide, and magnesium carbonate; and
   at least one vulcanizing agent, wherein the vulcanizing agent comprises a peroxide curative.

2. The composition according to claim 1, wherein the vinylacetate content of EVM is around 65% by weight.

3. The composition according to claim 1, wherein 100 parts by weight of elastomer comprises a blend of more than one EVM, each one of which having different contents of vinylacetate in the range from 60 to 70% by weight.

4. The composition according to claim 1, comprising 100 parts by weight of elastomer comprising a blend of a first EVM containing from 60 to 65% by weight of vinylacetate and a second EVM containing from 65 to 70% by weight of vinylacetate.

5. The composition according to claim 1, comprising 100 parts by weight of elastomer comprising a blend of a first EVM containing around 60% by weight of vinylacetate and a second EVM containing around 70% by weight of vinylacetate.

6. The composition according to claim 1, comprising 100 parts by weight of elastomer comprising a blend of around 45 parts of a first EVM containing from 60 to 65% by weight of vinylacetate and around 20 parts of a second EVM containing from 65 to 70% by weight of vinylacetate.

7. The composition according to claim 1, comprising 100 parts by weight of elastomer comprising a blend of around 45 parts of a first EVM containing around 60% by weight of vinylacetate and around 20 parts of a second EVM containing around 70% by weight of vinylacetate.

8. The composition according to claim 1, wherein the ethylene content of EPDM is around 35% by weight and the propylene content of EPDM is around 65% by weight.

9. The composition according to claim 1, comprising 100 parts by weight of elastomer comprising around 35 parts of EPDM.

10. The composition according to claim 1, wherein the at least one fire retardant ingredient comprises one or more selected from the group consisting of fire retardant metal hydrates.

11. The composition according to claim 1, wherein the at least one fire retardant ingredient comprises from 100 to 150 parts per hundred parts by weight of elastomer of aluminum trihydrate (ATH) and from 25 to 30 parts per hundred parts by weight of elastomer of magnesium hydroxide.

12. The composition according to claim 1, wherein the peroxide curative is selected from the group consisting of Dicumyl peroxide, Di(tert-butylperoxyisopropyl)benzene, and 2,5-Dimethyl-2,5-di-(tert-butylperoxy)-hexane.

13. The composition according to claim 1, further comprising an inorganic silica source and less than 20 parts per hundred parts by weight of elastomer of carbon black.

14. The composition according to claim 1, further comprising Bis(2-ethylhexyl) adipate as plasticizer.

15. The composition according to claim 1, further comprising less than 10 parts per hundred parts by weight of elastomer of zinc oxide.

* * * * *